United States Patent Office 3,519,598
Patented July 7, 1970

3,519,598
STABILIZED POLY(ETHYLENE SULFIDE)
COMPOSITIONS
Roy Larsen, Lambertville, N.J., assignor to Thiokol Chemical Corporation, Bristol, Pa., a corporation of Delaware
No Drawing. Continuation of application Ser. No. 477,288, Aug. 4, 1965. This application June 21, 1968, Ser. No. 745,071
Int. Cl. C08g 51/56, 51/60, 51/62
U.S. Cl. 260—45.75                    20 Claims

ABSTRACT OF THE DISCLOSURE

Solid thermoplastic ethylene sulfide polymers are stabilized with a combination of certain organic nitrogen containing compounds and certain organic and inorganic compounds of Group II–B metals.

---

This application is a continuation application of Ser. No. 477,288 filed Aug. 4, 1965, now abandoned.

The present invention relates to the use of certain nitrogen containing compounds in combination with certain metal compounds as a stabilizer system for solid, moldable, high molecular weight ethylene sulfide polymers.

Recent advances in the polymeric field have provided solvent resistant ethylene sulfide polymers of high molecular weight for use as high temperature injection molding and extrusion materials. Because of their very good solvent resistance and high temperature melting properties, these polymers can be molded into a variety of useful objects such as pipe, film, filament, rods, bars, gears, pumps, valves, etc. The viogorous molding conditions, i.e., time and temperature, usually employed when molding such materials, however, can lead to some degradation of the polymer being molded as evidenced by changes in the color of, and/or emission of odors from and/or, the lowering of the melting point, and/or melt index total flow time and/or survival index of these materials. Such degradation, if allowed to go unchecked, would seriously lessen the value of the molded end products produced from these polymers.

The object of the present invention, therefore, is to provide stabilizers which will protect high molecular weight ethylene sulfide polymers against thermal degradation during high temperature molding operations.

In the co-pending U.S. patent applications, Ser. No. 267,604 filed Mar. 25, 1963, now abandoned, Ser. No. 267,605 filed Mar. 25, 1963, now abandoned, Ser. No. 312,847 filed Oct. 1, 1963 now abandoned, Ser. No. 323,074 filed Nov. 12, 1963 now abandoned, refiled as a continuation application Ser. No. 609,280 filed Jan. 12, 1967, now abandoned and refiled as a continuation-in-part application Ser. No. 719,839 filed Apr. 9, 1968 and Ser. No. 349,799 filed Mar. 6, 1964 now abandoned. It was shown that high molecular weight, moldable ethylene sulfide polymers can be protected against degradation during high temperature molding operations conducted therewith if there is added to the polymer about 0.05 to 5 and preferably about 0.5 to 3% by weight of the polymer being molded of, as a stabilizer, one or more of certain organic nitrogen containing compounds. The nitrogen-containing compounds included amides; amines; and compounds containing nitrogen in a ring structure and other nitrogen-containing compounds.

It has now been found, according to the present invention, that the stabilizing action of the above-mentioned organic nitrogen-containing compounds can be enhanced by the use therewith of certain metal compounds in a concentration of about 0.11 to 10% and preferably about 0.5 to 3% by weight of the polymer being molded. When used alone these metal compounds have little or no stabilizing effect, but, when used in combination with the nitrogen-containing compounds, they exhibit a synergistic effect. The two components of the stabilizer system of the present invention may be added to the moldable polymer separately, or as a physical admixture, or as a chemically pre-reacted composition. It is believed that the metal compound and the nitrogen-containing compound form a complex when prereacted together. Such a complex may be used alone as the stabilizer for the molding polymer according to the present invention or it may be used in combination with still another nitrogen-containing compound to form a stabilizing system according to the present invention.

The stabilizer system according to the present invention should be a solid or liquid high boiling composition that will remain in a substantially nonvolatile state when used in combination with the moldable polymer in the range of the molding temperatures being employed, i.e., usually about 215–270° C., or more. For this reason the stabilizer systems of the present invention and/or the components thereof should, preferably, have boiling points of about at least 200° C. To be practically useful, the stabilizer system should be as uniformly dispersed as possible throughout the moldable polymer mass being stabilized therewith.

The metal compounds which may be used in accordance with the present invention are preferably those compounds which contain metals of Group II–B of the Periodic Table of Elements. These compounds include both inorganic and organic compounds and preferably those containing a halide or a metal-oxygen bond. Examples of inorganic compounds of this type include the halides, oxides, carbonates, hydroxides, titanates and zirconates of the Group II–B metals. Examples of organic compounds of this type include the Group II–B metal salts of organic acids such as acetates, acrylates, adipates, anthranilates, benzoates, formates, glutarates, glycinates, palmitates, phthalates, pyromellitates, salicylates, streates, succinates, trehephthalates, thiodibutyrates, thiodipropionates and other Group II–B metal-containing compounds containing a metaloxygen bond such as acetyl acetonates and phenolates. The preferred of the Group II–B metal-containing compounds are the zinc-containing compounds, especially zinc oxide and the zinc salts of armoatic acids since these compounds tend to exhibit a more pronounced stabilizing activity than others of the same type described herein.

The Group II–B metal compounds may be used at a concentration of about 0.1 to 10%, and preferably from about 1 to 3%, based on the weight of the polymer in combination with the nitrogen containing compounds described below.

The amides which may be used as stabilizers according to the present invention may be monomeric or polymeric in nature and should contain at least five carbon atoms. The polymeric amides may contain the amide groups in the backbone thereof, or the amide groups may be pendant to the polymeric backbone. Examples of such materials are caprolactam (M.P. 70° C., B.P. 180° C), adipamide (MP. 226–277 C.); a low molecular weight polyamide formed from hexamethylenediamine and adipic acid and having a softening point of >50 C.<100° C.; acrylamide homopolymers and interpolymers; fatty acid polyamides; N,N-bis (hydroxyethyl) acrylamide; adipoyldihydrazide and adducts of methylene-bis-acrylamide and polyamines such as ethylene diamine and diethylene triamine.

The amines which may be used as the organic nitrogen-containing compounds of the stabilizer systems according to the present invention may be monofunctional or polyfunctional amines in which the amine groups may be primary, secondary, or tertiary. Other functional groups may also be present.

Monofunctional amines containing no other functional groups should contain at least eight carbon atoms and include aliphatic compounds such as n- octadecylamine (B.P. 232° C.; M.P. 47–51° C.) and branched octadecyldimethylamine (M.P. approximately 40 C.).

Monofunctional amines containing other functional groups include hydroxyl-containing amines such as those having the structures:

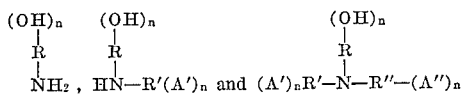

in which R, R' and R'' may be the same or different hydrocarbon or oxyhydrocarbon groups A' and A'' are H or OH and $n$ is a whole number of at least 1. An R' or R'' group may have more than one OH group.

Examples of such hydroxyl-containing amines are the following: diethanolamine, diisopropanolamine, diglycolamine (HOCH$_2$CH$_2$OCH$_2$CH$_2$NH$_2$), aminotris (hydroxymethyl) methane, N-(2-hydroxyethyl) cyclohexylamine, DL-2-benzylamino-1-propanol, phenylethylethanolamine, m-tolyldiethanolamine and phenyldiethanolamine.

Polyfunctional amines which may be used according to the present invention include aliphatic tertiary amines such as N,N,N',N'-tetrakis (ethyl) ethylenediamine, N,N,N',N'-tetrakis (2-cyanoethyl) ethylenediamine; polyalkanolpolyamines such as N,N,N',N'-tetrakis (2-hydroxyethyl) ethylenediamine, N,N,N',N'-tetrakis (2-hydroxypropyl) ethylenediamine, and

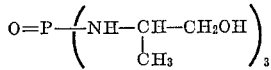

compounds having the structure A—NH(R—NH)$_n$A' in which R is an alkylene, arylene, alkarylene, or aralkylene group, $n$ is a whole number of at least 1; A and A' may be the same or different and may be H, R', —(RO—)$_x$H, —RCN,

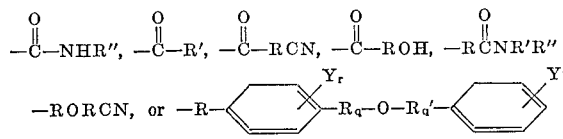

in which R is the same as above, R' is an alkyl, cycloalkyl, aryl, alkaryl or aralkyl group, R'' is H or R', $x$ is a whole number of 1 through 25, Y and Y' may be the same or different and may be —R (NHR)$_n$—NH—A, —CH$_2$OH, or R' in which A, R and R' are the same as above, $q$ and $q'$ are 0 or 1, $r$ is 0 or a whole number from 1 through 4, and $t$ is 0 or a whole number from 1 through 5. A limiting value for $x$ has been given because as the length of the polyether chain increases, the activity of the amine portion, which is believed to be the more active portion for stabilizing purposes, tends to diminish. However, no such limiting value has been given to the subscript $n$ since, regardless of the length of the polyamine chain, there does not appear to be any lessening of the activity of the amine function for stabilizing purposes.

The preferred amines are the polyalkylene polyamines and polyfunctional amines having the above-mentioned structure A—NH(R—NH)$_n$A' wherein A and/or A' may be

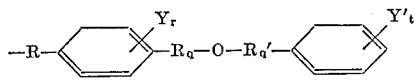

Examples of polyfunctional amines which may be used according to the present invention are polyalkylene polyamines, such as, diethylene triamine, triethylene tetramine, tetraethylene pentamine, pentaethylene hexamine, dipropylene triamine, tripropylene tetramine, tetrapropylene pentamine, di-1,3-propylene triamine, tri-1,3-propylene tetramine, dibutylene triamine, tributylene tetramine, tetrabutylene pentamine, bis(hexamethylene)triamine; N-(β-hydroxyethyl) diethylene triamine; p-amino-diphenylamine, p-phenylenediamine, bis(p-ethylamino)diphenylamine poly(alkylene imines), such as poly(ethyleneimine); adducts of alkylene oxides and polyalkylene polyamines such as an adduct of ethylene oxide or propylene oxide and tetraethylene pentamine, diethylene triamine or dipropylene triamine; adducts of polymerized alkylene imines and alkylene or aryl oxides such as adducts of polymerized ethyleneimine or ethylenediamine and styrene oxide; adducts of alkylene or polyalkylene polyamines and unsaturated nitriles, such as, adducts of ethylenediamine or diethylene triamine and acrylonitrile; adducts of polyalkylene polyamines and alkyl halides, such as, adducts of tetraethylene pentamine and n-octyl chloride; adducts of polyalkylene polyamines and alkyl or aryl isocyanates, such as adducts of tetraethylenepentamine and phenyl or ethyl isocyanate; alkylene diureas such as 1,1'ethylenediurea; adducts of unsaturated amides and alkylene or polyalkylene polyamines, such as, an adduct of ethylenediamine and acrylamide; adducts of alkylene or polyalkylene polyamines and chloromethylated diphenyl oxides such as the ethylene diamine or diethylenetriamine adduct of chloromethylated diphenyl oxide.

Compounds containing nitrogen in a ring structure which may be used according to the present invention include:

tris-(2-methyl aziridinyl)triazine; tripropyleneimine melamine; phthalazine;

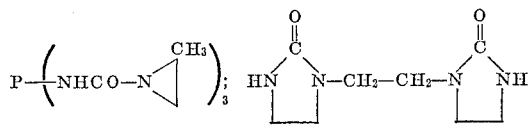

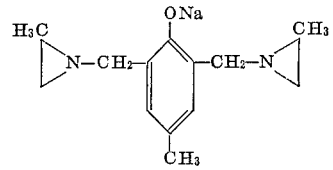

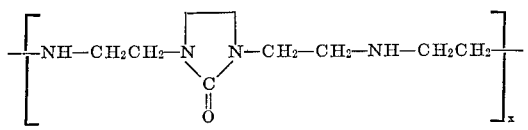

and

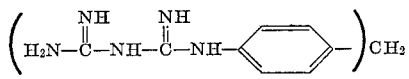

Other nitrogen-containing compounds which may be used according to the present invention include:

adducts of P(NCO)$_3$ and polyalkylene polyamines such as diethylene triamine and triethylene tetramine;

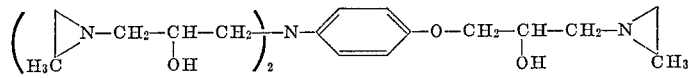

and adducts of 2,5-hexanedione and alkylene polyamines such as ethylene diamine and triethylene tetramine;

All of the organic nitrogen-containing compounds mentioned above have boiling points at at least 200° C. The preferred stabilizer system comprises the combination of one of the preferred amines having the structure: A—NH(R—NH)$_n$A' wherein A and/or A' may be

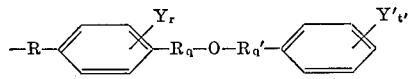

as mentioned above and a partially hydrolyzed zinc chloride prepared by heating zinc chloride and diethylenetriamine in aqueous solution.

By adduct it is meant a reaction product.

The solid, high molecular weight moldable ethylene sulfide polymers which may be treated with the stabilizers according to the present invention may be homopolymers or they may be interpolymers which contain a major portion of ethylene sulfide and a minor portion of one or more other interpolymerizable monomers. Such other interpolymerizable monomers would include (A) vicinal episulfide monomers such as styrene sulfide and alkylene sulfides such as propylene sulfide, 1,2-butylene sulfide, 2,3-butylene sulfide, isobutylene sulfide, cyclohexene sulfide, vinyl cyclohexane sulfide, 2-benzyl-triirane, para-methyl styrene episulfide, allyl thioglycidyl ether, thio-glycidyl acrylates, thioglycidyl alka-acrylates such as thioglycidyl methacrylate, vinyl cyclohexene episulfide, butadiene monoepisulfide and 1,2-epoxy-3,4-epithio-butane; (B) cyclic sulfides having the structure

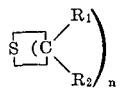

where $n=3$ to 6 and $R_1$ and $R_2$ may be H, a lower, branched or linear alkyl group having from 1 to 10 carbon atoms, an aryl, an arylalkyl and/or an alkylaryl group, and $R_1$ or $R_2$ may also be heterocyclic, alicyclic, bicyclic or polycyclic; examples of such cyclic sulfides are trimethylene sulfide, pentamethylene sulfide and hexa-methylene sulfide; (C) compounds containing ethylenic unsaturation, i.e., $CH_2=C<$, such as olefins, such as ethylene, propylene, butylene and isobutylene; conjugated and nonconjugated dienes, such as butadiene, isoprene and 1,4-pentadiene; and vinyls, such as styrene, vinyl acetate, ethyl acrylate, methyl acrylate, methyl methacrylate, butyl acrylate, acrylonitrile, vinyl isobutyl ether, α-methyl styrene, hydroxypropyl methacrylate, tetra-fluoroethylene, chlorotrifluoroethylene and hexafluoro-propylene; (D) compounds having the structure

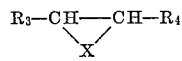

in which X is O or N and $R_3$ and $R_4$ may be H, a lower branched or linear alkyl group having from 1 to 10 carbon atoms, an aryl, aralkyl, and/or alkaryl group; and $R_3$ or $R_4$ may also be heterocyclic, alicyclic, bicyclic or polycyclic; examples of such compounds are styrene oxide, ethylene oxide, propylene oxide, 1,2-butylene oxide, 2,3-butylene oxide, ethylene imine and propylene imine; and (E) other polymerizable compounds such as form-aldehyde, trioxane, hydroxyisobutyric acid, tetrahydro-furan, 1,3-dioxolane, 1,4-dioxane, trimethylene oxide, tetramethylene oxide and pentamethylene oxide.

These polymers may be prepared using a variety of polymerization catalysts under a variety of polymerization conditions. The most noteworthy to date, of these catalysts are certain composite materials which are the reaction product of two components. One of these components is an organometallic compound of the formula $R_2M$ wherein R is alkyl or aryl and M is a metal of Group II-B of the periodic system, i.e., zinc, cadmium or mercury.

The second component, which is reacted with the or-ganometallic component to form the catalyst, can be generally characterized as a substance having at least one pair of unshared electrons. However, all substances falling within this broad genus do not appear to be operative. One relatively large sub-genus that has benn found to be opera-tive comprises compounds having an active hydrogen atom including, for example, water; hydrogen sulfide; primary and secondary alkylamines; e.g., methyl, ethyl and diethyl amines; alkanols, e.g., mercaptoethanol, acetone; lower fatty acids, e.g., acetic acid, and aldehydes, e.g., butyral-dehyde. In addition to this sub-genus, i.e., the compounds having an active hydrogen, it has been found that useful catalysts can be prepared employing as the second component or co-catalyst elemental oxygen or sulfur, carbonyl sulfide and carbon disulfide. The preferred catalyst is the reaction product of diethylzinc and water.

These composite catalysts can be conveniently prepared by reacting the two components described above in a suitable inert liquid reaction medium, e.g., benzene, hexane, tetrahydrofuran, petroleum ether or mineral oil. The molar ratio of co-catalyst to organometallic component is preferably in the range 0.5:1 to 3:1, with the optimum ratio usually being about 1:1. The reaction temperature does not appear to be particularly critical and may vary from say $-20°$ C. to $100°$ C., with the preferred range being $20°$ to $50°$ C. It is evident that in some cases the boiling point of the liquid reaction medium will determine the upper temperature limit.

To insure optimum catalyst activity and the attainment of the highest molecular weights, the catalyst should be freshly prepared and used as soon as possible after its preparation. In some cases it will be found desirable to prepare the catalyst in the polymerization reaction vessel just prior to or coincident with the initiation of the polymerization reaction. If it is necessary to store the catalyst for an appreciable period of time before it is used, say 48 hours or more, the activity of the catalyst can best be maintained by storage at a reduced temperature.

Since both oxygen and water are active co-catalysts, any free oxygen or water present in the atmosphere or in any of the materials used is capable of modifying the properties of the catalyst. Hence in order to avoid undesired alteration of the catalyst properties, both the preparation of the catalyst and the polymerization reaction should be carried out in an environment substantially free from elemental oxygen and water, except insofar as these substances may be present as catalyst components. Catalyst preparation and polymerization are desirably carried out in an atmosphere of inert gas such as nitrogen, helium or argon. It has been found that, in general, commercially available grades of the catalyst components can be used. The liquid reaction medium used should desirably be either dried over sodium or freshly distilled.

Details of the polymerization process are given in one of the specific examples set forth below. In general the polymerization process is executed by bringing the monomer or monomers to be polymerized into contact with the catalyst prepared in the general manner described above. It is preferable, in order to obtain optimum results, that the starting monomeric materials be freshly distilled just prior to use from a reducing agent, e.g., calcium hydride, to remove oxidation products and water therefrom. The amount of catalyst used ordinarily falls within the range .05 to 3% by weight of the monomer mixture, the preferred amount of catalyst being about 0.5% by weight. The polymerization reaction can be carried out over a rather wide range of temperatures, say $-20°$ C. to $150°$ C. A typical reaction temperature is given in the specific example. The reaction time may vary from a few minutes to 48 hours or more depending upon the reaction conditions and the nature of the monomeric material.

The polymerization reaction may be conducted in any of various ways, such as in bulk without solvent, or in a solvent or emulsion, or even in the vapor phase. Solvent polymerization is preferred in most cases, and any of various solvents may be used, such as aromatic hydrocarbons, e.g., benzene, toluene or xylene; aliphatic hydrocarbons, e.g., isopentane, n-hexane or octane; chlorinated hydrocarbons, e.g., carbon tetrachloride, methylene chloride or ethylene chloride; ethers, e.g., diethyl ether, dioxane, or tetrahydrofuran.

The reaction mixture may be agitated to facilitate the reaction. The pressure at which the reaction is carried out does not appear to be particularly critical. Thus the reaction can be conducted in an open vessel at atmospheric pressure or in a closed vessel under autogenous or other pressure. In either case the reaction environment should be kept oxygen-free and water-free by the use of an atmosphere of purified inert gas for the reasons pointed out above.

The polymers produced with the catalysts and processes described above tend to be fine particle sized, fluffy powders which are difficult to handle and manipulate, particularly during the molding operations customarily employed therewith. Moldable homopolymers and interpolymers of a more granular nature and which have better handling properties may be produced using a "seed catalyst" technique. These granular powders may also be stabilized with the stabilizers of the present invention. In the "seed catalyst" procedure the organometallic compound/cocatalyst material (in about a 1:1 mol ratio) is used to polymerize the episulfide monomer charge in solution at room temperature. About 0.05 to 10 mol percent catalyst is used based on the monomer charge. The solvents used are those such as tetrahydrofuran, petroleum ether, benzene and toluene. The conversion is proportional to the amount of catalyst used and the polymer product contains, combined therewith, all the catalyst initially charged. The fluffy polymer product is then isolated and dried. This product is then compacted to form dense cakes and the cakes are then ground to form particles of less than 20 mesh in size. This granulated polymer product which contains the original catalyst charge, in the form, it is believed, of an activated zinc compound such as zinc oxide, is then used as a "seed catalyst" with which to polymerize ethylene sulfide alone or with other monomers to form granular powders. About 1 to 5% by weight of the seed catalyst is used based on the monomer charge. The seed catalyst based polymerization is conducted at elevated temperatures of about 176±5° F. for about one to three hours. The yields of the granular polymer obtained are about 80–100%. The seed catalyst polymer and the polymer produced therewith have essentially the same chemical characteristics and they are used in combination in subsequent molding operations without separating one from the other.

Other catalysts, which are more simple in structure, which may be used to prepare moldable, fluffy ethylene sulfide polymers with which the various stabilizers mentioned above may be used in accordance with the teachings of the present invention include cadmium compounds such as hydroxides, sulfides, silicates, chromates, adipates, sulfates and carbonates as disclosed in S.N. 255,675 filed Feb. 1, 1963 now abandoned; zinc or mercury compounds such as peroxides, sulfides, chromates, adipates, oxalates, oxides, hydroxides and carbonates, as disclosed in S.N. 269,774 filed Apr. 1, 1963 now abandoned; carbonates of zinc, manganese, lead, cadmium, cobalt and nickel as disclosed in S.N. 213,015 filed July 27, 1962; oxides of metals in an integer oxidation state, i.e., valence, of not greater than IV which fall into period 3, groups I–A, II–A, and III–A; period 4, groups I–A, II–A and VIII; period 5, groups II–A, IV–A, and V–A; and period 6, groups II–A, IV–A and V–A of the Periodic Table of the elements. These oxides include $Na_2O$, $Na_2O_2$; $\overline{MgO}$; $Al_2O_3$; $K_2O$, $K_2O_2$; $CaO$, $CaO_2$; $Fe_2O_3$; $CoO$; $NiO$; $SrO$, $SrO_2$; $SnO$, $SnO_2$; $Sb_2O_3$; $BaO$, $BaO_2$; $BbO$, $PbO_2$ and $Bi_2O_3$, as disclosed in S.N. 269,772 filed Apr. 1, 1963 now U.S. Pat. No. 3,281,399. Other catalytic systems which may be used to form moldable polymers which may be stabilized according to the present invention include Friedel-Crafts catalysts such as sulfuric acid and boron trifluoride; ionizing radiation; sodium naphthenate; sodium cyanide; metal alkyls such as butyl lithium and metallic sodium dispersions.

The catalysts mentioned above may be used in a variety of polymerization procedures to produce ethylene sulfide homopolymers or graft, random or block interpolymers of ethylene sulfide and one or more of the other polymerizable monomers described above.

Melt index studies were used to illustrate the utility of the nitrogen-containing compounds and metal compounds as co-stabilizers for moldable ethylene sulfide polymers. The melt index data shown in the accompanying examples compare the results obtained using ethylene sulfide polymers stabilized with one of several of the stabilizer systems of the present invention and the results obtained using the same ethylene sulfide polymers stabilized with the nitrogen-containing component of the system alone under simulated high temperature molding conditions. The melt index may be defined as an empirical measure of the flow properties of a polymer which in turn is indicative of its molecular weight. Generally, degradation of a polymeric material results in the production of relatively low molecular weight products. Thus, the melt index can also be used as a measure of polymer degradation. Reproducible test results can only be obtained by using polymers having approximately the same molecular weight.

In order to evaluate the systems as disclosed in the examples below, the stabilizers were admixed with the polymer in either of two ways: (1) the components of the stabilizer system, at the concentration level indicated in the examples, were intimately mixed with a separate portion of the ethylene sulfide polymer for about 10 minutes, using a Waring Blendor, to effect a uniform powdery blend as in Examples 2 to 27, 29 to 41, and 43 to 53; and (2) the components of the stabilizer system were dissolved in a low-boiling solvent and this solution was added to the polymer to form a homogeneous slurry which was then dried to remove the solvent, as in Examples 54 to 56. Each blend was then tested for melt index properties using a capillary flow plastometer, as specified in ASTM Method D1238–57T and as sold by F. F. Slocomb Corporation of Wilmington, Delaware. The reservoir of the instrument was preheated and maintained at the temperature indicated in the examples. This reservoir was then charged with about 4 grams of sample in about two minutes. A 5 kilogram weight was then placed on top of the charge by means of a ram and allowed to remain there for a period of time, which, in combination with the charging time, would total 4 minutes. After this time interval, it was replaced with a 2.160 kilogram weight. The plug was removed from the flow orifice and the amount of sample which flowed through the orifice in each minute interval thereafter was separately collected and accurately weighed to the nearest milligram. A control sample of ethylene sulfide polymer which contained only the nitrogen-containing compound as a stabilizer was tested at each of the simulated test temperatures as above to gain comparative data.

In the examples, the term "total flow time" refers to the total number of minutes required for the polymer sample to flow out of the plastometer. The term "survival index" refers to the number of minutes required for the polymer flow from the plastometer to attain a rate of 0.25 g./min.

The following examples are merely illustrative of the present invention and are not intended as a limitation upon the scope thereof.

EXAMPLE 1

(A) Preparation of seed catalyst

Under a nitrogen atmosphere the following reactants were added, in the order presented, into a 2½ gallon solution bottle: 2835 ml. of tetrahydrofuran and sufficient diethyl zinc to effect a 1:1 mol ratio with 9.838 ml.

of water added subsequent to the diethyl zinc. The materials were agitated by sparging with nitrogen. Into a second vessel, a clean dry reactor, purged with nitrogen, 51.9 pounds of petroleum ether was added and then charged with 6.49 pounds of ethylene sulfide. The temperature of the reactor was then adjusted to 78±2° F. and the entire above prepared solution of tetrahydrofuran, diethyl zinc and water added. The reactor was then agitated for one hour at the above temperature. The polymer thus produced was centrifuged out and subsequently dried for 3 hours at 160 to 180° F. under reduced pressure. The dried polymer was then compacted and pulverized to pass through a #40 screen. A yield of 1.3 pounds of seed catalyst polymer was thereby obtained.

trol." Stabilization of the polymer is judged by total flow time, as previously defined, a longer flow time indicating greater stabilization. The components of the stabilizer system in each case were added separately to the polymer being stabilized therewith. During the tests conducted as described herein the reservoir of the test instrument was maintained at 235±1° C.

In each of these examples 1% by weight of the N-containing compound was used based on the weight of polymer being stabilized. With the exception of Example 24, 1% by weight of the metal compound was used based on the weight of polymer being stabilized. In Example 24, 0.5% by weight of cadmium carbonate was used. For the controls, 1% by weight of the N-containing compound was used in each case.

TABLE I

| | | | Tota flow time (min.) | |
|---|---|---|---|---|
| Ex. | Metal compound | N-containing compound | N compound+ metal comp. | Control |
| 2 | Zinc acetate | Diethylenetriamine | 48.6 | 31.8 |
| 3 | Zinc acetyl acetonate | do | 43 | 27 |
| 4 | Zinc acrylate | do | 49 | 27 |
| 5 | Zinc adipate | do | 51 | 27 |
| 6 | Zinc anthranilate | do | 41 | 27 |
| 7 | Zinc glutarate | do | 51 | 27 |
| 8 | Zinc gycinate | do | 68 | 27 |
| 9 | Zinc palmitate | do | 46 | 27 |
| 10 | Zinc phthalate | do | 66 | 27 |
| 11 | Zinc pyromelliate | do | 33 | 27 |
| 12 | Zinc salicylate | do | 66 | 27 |
| 13 | Zinc stearate | do | 35.1 | 31.8 |
| 14 | Zinc succinate | do | 50 | 27 |
| 15 | Zinc terephthalate | do | 36 | 27 |
| 16 | Zinc thiodibutyrate | do | 53 | 27 |
| 17 | Zinc thiodipropionate | do | 43 | 27 |
| 18 | Zinc carbonate | do | 46.4 | 31.8 |
| 19 | Zinc oxide | do | 45 | 27 |
| 20 | do | $(H_2NCH_2CH_2NHCH_2C_6G_4)_2O$ | 19 | 5 |
| 21 | Zinc titanate | Diethylenetriamine | 30 | 27 |
| 22 | Zinc zirconate | do | 41 | 27 |
| 23 | Cadmium acetate | do | 40 | 27 |
| 24 | Cadmium carbonate | $(HOCH_2CH_2NHCH_2CH_2)_2NH$ contg. 4-5% diethylenetriamine. | 25 | 11 |
| 25 | Mercuric oxide | Diethylenetriamine | 27.5 | 18.8 |

(B) Preparation of the polymer

A suitable sized reactor was purged with nitrogen for 15 minutes and charged with 120 pounds of petroleum ether and 60.1 pounds of ethylene sulfide in the order presented. An additional 50 pounds of petroleum ether was then charged into the reactor to completely flush the ethylene sulfide from the charging lines into the reactor. The seed catalyst, prepared in (A) above, was then charged into the reactor, the nitrogen shut off, the reactor sealed and the temperature raised to 176±5° F. in 1½ hours. The reaction was continued at this temperature for two additional hours. The polymerized mass and solvent was then cooled to less than 100° F., separated by centrifuging and dried under reduced pressure for four hours at about 190° F. A yield of about 80% was obtained.

EXAMPLES 2 TO 25

The data in Table I, show a comparison between the stabilizing effect on ethylene sulfide polymers, prepared as in Example 1, of a stabilizer system comprising a Group II–B metal compound and a polyamine or substituted polyamine and the stabilizing effect of the polyamine or substituted polyamine alone, designated as "con-

EXAMPLES 26 TO 27

The data in Table II are similar to Table I except that stabilization of the polymer is judged by survival index, as previously defined, a higher survival index indicating greater stabilization. The components of the stabilizer system were added separately to the polymer. The polymer was made as in Example 1. The reservoir of the test instrument was maintained at 235±1° C. during these tests.

In each of these examples 1% by weight of the N-containing compounds in combination with 1% by weight of the metal compound was compared against 10% by weight of the N-containing compound alone.

TABLE II

| | | | Survival index (min.) | |
|---|---|---|---|---|
| Ex. | Metal compound | N-containing compound | N-containing Comp.+ metal comp. | Control |
| 26 | Zinc salt of 2,5-ditertamylhydroquinone | Diethylenetriamine | 45 | 20 |
| 27 | (2,6-dimethoxyphenyl)–O–$Zn_n$–O–(2,6-dimethoxyphenyl) | do | 32 | 20 |

EXAMPLE 28

A solution of 450 g. of zinc chloride (3.3 moles) in 1 liter of water was added slowly with agitation to a solution of 340 g. of diethylene triamine in 1500 ml. of water. An exothermic reaction occurred with the formation of a white precipitate which was filtered, washed with water and acetone, and dried overnight in a vacuum oven giving a yield of 50 g. The elemental analysis of the product was as follows: N, 0.838%; Ash, 57.64%; Cl, 14.88%. On heating the compound, no ignition occurred; the white solid turned yellow. (Typical behavior of zinc oxide.) Thermal gravimetric analysis showed a weight loss of ~20%, which would indicate the presence of hydroxide. The presence of chlorine indicates probably either a mixture of zinc hydroxide and zinc chloride or a mixed salt. The low percent N indicate a very small amount of amine in the product, which shall be referred to herein as a partially hydrolyzed zinc chloride. This compound by itself had no stabilizing effect on ethylene sulfide polymers as shown in Example 29.

Using partially hydrolyzed zinc chloride as prepared in Example 28, a series of nitrogen-containing compounds were tested in combination therewith as stabilizers for ethylene sulfide polymers. The data are recorded in Tables III and IV wherein the column headings have the same meanings as previously given. The stabilizer components were added separately to the polymer. In all cases, the combination of the nitrogen-containing compound with the hydrolyzed zinc chloride had a greater stabilizing effect than the nitrogen-containing compound alone. The polymer used in these tests was prepared as in Example 1. These tests were run at 235±1° C.

In these examples 1% by weight of N-containing compound plus 1% by weight of the zinc compound were compared for stabilizing activity against 1% by weight of the N-containing compound alone.

TABLE III

| Ex | Nitrogen-containing compound | Survival index (min.) | |
|---|---|---|---|
| | | Combination | Control |
| 29 | None | 3 | |
| 30 | Diethylenetriamine | 73 | 20 |
| 31 | (HOCH$_2$CH$_2$NHCH$_2$CH$_2$)$_2$NH contg. 4-5% diethylenetriamine. | 24 | 15.5 |
| 32 | Diethanolamine | 27.5 | 10.5 |

TABLE IV

| Ex. | Nitrogen-Containing Compound | Total flow time (min.) | |
|---|---|---|---|
| | | Combination | Control (N-contg. comp.) |
| 33 | [H$_2$NCOCH$_2$CH$_2$NH(CH$_2$)$_6$]$_2$NH | 20 | 9.75 |
| 34 | CH$_3$(CH$_2$)$_{16}$CONHCH$_2$CH$_2$OH | 11 | 6.5 |
| 35 | N,N'-dibenzylethylenediamine | 13 | 7.75 |
| 36 | CH$_3$—NH(CH$_2$)$_3$—N—(CH$_2$)$_3$—N—(CH$_2$)$_3$—NH—CH$_3$<br>　　　　　　　　　｜　　　　　｜<br>　　　　　　　　　CH$_3$　　　CH$_3$ | 15 | 7 |
| 37 | 1-(β-aminoethyl)-2-imidazolidone | 53 | 18.4 |
| 38 | (H$_2$NCH$_2$CH$_2$NHCH$_2$C$_6$H$_4$)$_2$O | 52 | 19 |

EXAMPLES 39 TO 41

The stabilizer systems used in Examples 39 to 41 were prepared by heating the metal compound and N-containing compound components thereof in a 1:1 wt. ratio for 5 hours at about 200° C. with agitation in an atmosphere of nitrogen. The preheated systems were then tested as stabilizers for moldable ethylene sulfide polymers produced as in Example 1. The tests were made at 235±1° C.

The survival index data in Table V compare the stabilization using 2% (4% in Ex. 40) of the 1:1 prereacted system against 1% (2% in Ex. 40) of the N-containing compound alone. This latter amount of N-containing compound corresponds to the amount of N-containing compound in the total quantity of the prereacted system used.

TABLE V

| | | | Survival index (min.) | |
|---|---|---|---|---|
| Ex. | Components | Conc. percent | N-containing component alone | Prereacted system |
| 39 | ZnO/(HOCH$_2$CH$_2$NHCH$_2$CH$_2$)$_2$NH contg. 4-5% diethylenetriamine. | 2 | 16.6(1%) | 20.4 |
| 40 | do | 4 | 20.6(2%) | 34 |
| 41 | ZnO/diethylenetriamine | 2 | 30(1%) | 44 |

EXAMPLE 42

To a solution of diethylenetriamine (0.1 mole) in 100 ml. of dry tetrahydrofuran were added 50 ml. of a benzene solution of zinc acetyl acetonate (0.1 mole). A slightly exothermic reaction occurred with the formation of a thick precipitate. More tetrahydrofuran was added and the precipitate was filtered and washed with tetrahydrofuran and dried. The product had the following analysis: Ash, 19.33%; N, 11.91% and is considered to be a complex of diethylenetriamine and zinc acetyl acetonate.

EXAMPLES 43 TO 52

The prereacted stabilizer system prepared from diethylenetriamine and zinc acetyl acetonate, as described in Example 42, was tested as a stabilizer for moldable ethylene sulfide polymers produced as in Example 1. It was also tested in combination with other nitrogen-containing compounds. The data are given in Table VI using survival index values. The results show that the prereacted diethylenethiamine zinc acetyl acetonate stabilizer system (ZnAA/DET), combined with additional amounts of an amine, is more effective as a stabilizer than increased amounts of the amine alone. The tests were made at 235±1° C.

TABLE VI

| Ex. | Weight percent ZnAA/DET | Additional N-cont. comp. | Weight percent N-comp. alone | Survival index (min.) |
|---|---|---|---|---|
| 43 | | None | None | ¹3 |
| 44 | 1 | do | None | 25 |
| 45 | | Diethylenetriamine | 1 | 20 |
| 46 | | do | 1.5 | 13.5 |
| 47 | None | do | 2 | 13.5 |
| 48 | 1 | do | 1 | 43 |
| 49 | None | (HOCH$_2$CH$_2$NHCH$_2$CH$_2$)$_2$NH contg. 4-5% diethylenetriamine. | 1 | 14.5 |
| 50 | None | do | 1.5 | 12.5 |
| 51 | None | do | 2 | 15.5 |
| 52 | 1 | do | 1 | 40 |

¹ Total flow time for polymer alone.

EXAMPLE 53

A mixture of one part by weight of zinc oxide and one part by weight of bis(hexamethylene)triamine was heated at 100° C. for 1 hour. When a moldable ethylene sulfide polymer prepared as in Example 1 was stabilized with 2% by weight of the above stabilizer system, the total flow time at 235° C. was 33 minutes. Using 2% by weight of an unheated 1:1 admixture of the same components as the stabilizer system, the total flow time was only 23 minutes. This indicates some type of activation in the prereacted mixture. The total flow time using 1% of bis(hexamethylene)triamine as the only stabilizer was 12 minutes. The tests were made at 235±1° C.

EXAMPLE 54

The components of the stabilizer system were admixed with the polymer as follows: a solution of the indicated concentration of the components dissolved in 250 ml. of water was admixed with 100 grams of ethylene sulfide polymer, prepared as in Example 1, to form a homogeneous slurry which was then dried at 140±10° F. to remove the water and form a dry powder. For the control, the corresponding amount of N-containing compound, alone, was blended with 100 grams of the same ethylene sulfide polymer using a Waring Blendor.

The comparative data are listed in Table VII wherein the values for the total flow time measured at 235° C. indicate an improvement in stabilization using the composite stabilizer system as compared with the N-containing compound alone. The N-containing compound used was $(H_2NCH_2CH_2NHCH_2C_6H_4)_2O$.

TABLE VII

| | | | Total flow time (min.) | |
|---|---|---|---|---|
| Metal Comp. | Grams | N-containing comp. (grams) | N-containing Comp.+Metal Comp. | Control |
| ZnF₂ | 1.26 | 3.0 | 19 | 13 |

The stabilized compositions of the present invention may also contain adjuvant materials such as pigments, antioxidants, UV stabilizers, fillers, flame retardant agents, nucleating agents, lubricants and the like which are commonly employed in the molding arts.

I claim:

1. A composition of matter comprising an admixture of solid thermoplastic poly(ethylene sulfide) and a stabilizing system for such polymer formed from
  (A) at least one component which is a Group II–B metal-containing compound selected from the group consisting of the Group II–B metal halides, oxides, carbonates, hydroxides, titanates, zirconates, carboxylate, phenolates, and acetyl acetonates and
  (B) at least one second component which is an organic nitrogen-containing compound selected from the group consisting of
    (1) amides containing at least 5 carbon atoms;
    (2) monofunctional, unsubstituted aliphatic amines containing at least 8 carbon atoms;
    (3) monofunctional hydroxyl-containing amines having the structures:

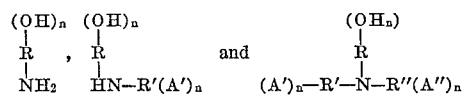

where R, R' and R'' are hydrocarbon or oxyhydrocarbon groups, A' and A'' are H or OH, and $n$ is a whole number of at least 1; and
    (4) polyamines having the structure

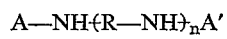

in which R is selected from the group consisting of alkylene, arylene, alkarylene and aralkylene groups; $n$ is a whole number of at least 1;

A and A' are selected from the group consisting of

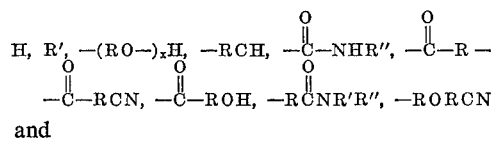

and

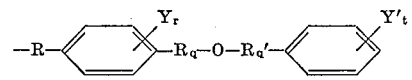

in which R is the same as above, R' is selected from the group consisting of alkyl, aryl, alkaryl and aralkyl groups; R'' is selected from the group consisting of H and R'; $x$ is a whole number from 1 through 25; Y and Y' are selected from the group consisting of

—$CH_2OH$, and R' in which A, R, and R' are the same as above; $q$ and $q'$ are 0 or 1; $r$ is 0 or a whole number from 1 through 4; and $t$ is 0 or a whole number from 1 through 5.

2. A composition of matter as in claim 1 in which said stabilizing system is formed by physically admixing said components.

3. A composition of matter as in claim 1 in which the components of said stabilizing system have been prereacted with each other by
  (1) allowing the components to react exothermically at room temperature in a suitable solvent until a precipitate forms and the exotherm has ceased, and separating and drying the precipitated prereacted components or
  (2) heating the solid components together in the absence of a solvent at a temperature up to about 200° C.

4. A composition of matter in claim 1 in which said organic, nitrogen-containing compound is an amide containing at least 5 carbon atoms.

5. A composition of matter as in claim 1 in which said organic, nitrogen-containing compound is an amine containing at least 8 carbon atoms.

6. A composition of matter as in claim 1 in which said amine is an hydroxyl-containing amine.

7. A composition of matter as in claim 1 in which said organic nitrogen-containing compound is a polyamine which has the structure A—NH(R—NH)$_n$A' in which R is selected from the group consisting of alkylene, arylene, alkarylene and aralkylene groups; $n$ is a whole number of at least 1; A and A' are selected from the groups consisting of H, R', —(RO—)$_x$H, —RCN,

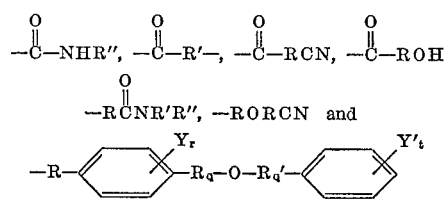

in which R is the same as above, R' is selected from the group consisting of alkyl, aryl, alkaryl and aralkyl groups; R'' is selected from the group consisting of H and R'; $x$ is a whole number from 1 through 25; Y and Y' are selected from the group consisting of

—$CH_2OH$, and R' in which A, R, and R' are the same as above; $q$ and $q'$ are 0 or 1; $r$ is 0 or a whole number from 1 through 4; and $t$ is 0 or a whole number from 1 through 5.

8. A composition of matter as in claim 1 in which said nitrogen-containing compound is

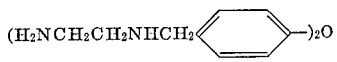

9. A composition of matter as in claim 1 in which said Group II–B metal is zinc.

10. A composition of matter as in claim 9 in which said Group II–B metal-containing compound is a halide of zinc.

11. A composition of matter as in claim 10 in which said organic nitrogen-containing compound has the structure A—NH$($R′NH$)_n$A′ in which A and A′ are H, R is an alkylene group, and $n$ is a whole number of at least 1.

12. A composition of matter as in claim 10 in which said organic nitrogen-containing compound has the structure A—NH$($R—NH$)_n$A′ in which $n$ is a whole number of at least 1, R is selected from the group consisting of alkylene, arylene, alkarylene and aralkylene groups; and A and A′ are selected from the group consisting of H and

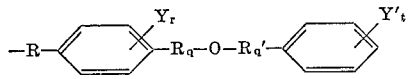

in which R is the same as above and Y and Y′ are selected from the group consisting of —R$($NHR$)_n$NH—A, —CH$_2$OH, and R′ in which A and R are the same as above and R′ is selected from the group consisting of alkyl, aryl, alkaryl and aralkyl groups; $q$ and $q'$ are 0 or 1; $r$ is 0 or a whole number from 1 through 4; and $t$ is 0 or a whole number from 1 through 5.

13. A composition of matter as in claim 12 in which said nitrogen-containing compound is

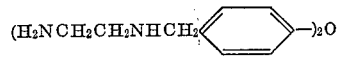

14. A composition of matter as in claim 9 in which said Group II–B metal-containing compound contains zinc bonded to an oxygen atom.

15. A composition of matter as in claim 14 in which said nitrogen-containing compound is

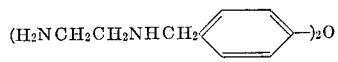

16. A composition of matter as in claim 14 in which said Group II–B metal compound is zinc oxide.

17. A composition of matter as in claim 14 in which said Group II–B metal compound is zinc hydroxide.

18. A composition of matter as in claim 14 in which said Group II–B metal-containing compound is the zinc salt of a carboxylic acid.

19. A composition of matter as in claim 18 in which said Group II–B metal-containing compound is zinc phthalate.

20. A composition of matter as in claim 18 in which said Group II–B metal-containing compound is zinc salicylate.

References Cited

UNITED STATES PATENTS

| | | | |
|---|---|---|---|
| 2,466,963 | 4/1949 | Patrick et al. | 260—79.1 |
| 3,046,248 | 7/1962 | Molnar | 260—31.8 |
| 3,365,431 | 1/1968 | Gohran et al. | 260—79.1 |

DONALD E. CZAJA, Primary Examiner

V. P. HOKE, Assistant Examiner

U.S. Cl. X.R.

260—37, 45.9, 79.7